United States Patent [19]

Kluttz et al.

[11] Patent Number: 5,451,619

[45] Date of Patent: Sep. 19, 1995

[54] ASPHALT COMPOSITION CONTAINING EPOXIDIZED POLYMERS

[75] Inventors: Robert Q. Kluttz, Houston; James R. Erickson, Katy, both of Tex.

[73] Assignee: Shell Oil Company, Houston, Tex.

[21] Appl. No.: 293,355

[22] Filed: Aug. 19, 1994

[51] Int. Cl.$^6$ ............ C08L 63/00; C08L 95/00; B32B 11/00; B32B 11/06

[52] U.S. Cl. .................... 523/450; 524/59; 524/68; 428/291; 428/489; 428/490; 428/491

[58] Field of Search ............. 428/291, 489, 490, 491; 524/59, 68; 523/450

[56] References Cited

U.S. PATENT DOCUMENTS

| | | | |
|---|---|---|---|
| 5,229,464 | 7/1993 | Erickson et al. | 525/314 |
| 5,247,026 | 9/1993 | Erickson et al. | 525/331.9 |
| 5,331,028 | 7/1994 | Goodrich | 524/59 |

*Primary Examiner*—Peter A. Szekely
*Attorney, Agent, or Firm*—Donald F. Haas

[57] ABSTRACT

A bituminous composition comprising a bituminous component and an epoxidized polymer of a conjugated diolefin and, optionally, a vinyl aromatic hydrocarbon.

12 Claims, No Drawings

1

ASPHALT COMPOSITION CONTAINING EPOXIDIZED POLYMERS

BACKGROUND OF THE INVENTION

The present invention relates to asphalt compositions containing polymers for modification of the properties of the asphalt. More particularly, this invention relates to such compositions containing new polymers which are uniquely compatible with asphalt.

Asphalt is a common material utilized for the preparation of paving and roofing materials and also for coatings such as pipe coatings and tank liners. While the material is suitable in many respects, it inherently is deficient in some physical properties which it would be highly desirable to improve. Efforts have been made in this direction by addition of certain conjugated diene rubbers, ethylene containing plastics like EVA and polyethylene, neoprene, resins, fillers and other materials for the modification of one or more of the physical properties of the asphalt. Each of these added materials modifies the asphalt in one respect or another but certain deficiencies can be noted in all modifiers proposed. For example, some of them have excellent weather resistance, sealing and bonding properties but are often deficient with respect to warm tack, modulus, hardness and other physical properties; and some of them improve only the high temperature performance of asphalt, some only improve the low temperature performance of asphalt, while some lack thermal stability or mixing stability with asphalt.

Since the late 1960s, diene polymer rubbers such as styrene-butadiene rubber and styrene-rubber block copolymers such as styrene-butadiene-styrene and styrene-isoprene-styrene block copolymers have been used to dramatically improve the thermal and mechanical properties of asphalts. Practical application of the rubber addition approach requires that the blended product retain improved properties and homogeneity during transportation, storage and processing. Long term performance of elastomer-modified asphalts also depends on the ability of the blend to maintain thermal and chemical stability.

To be suitable for paving materials, the asphalt polymer mixtures should meet the following requirements:

(a) The polymer must be mixable in asphalt and stay mixed during subsequent processing—compatibility. In a modified asphalt composition, compatibility is important. The polar asphaltene fraction of the asphalt is generally incompatible with the polymer and phase separates over time. This phase separation leads to a serious deterioration in physical properties.

(b) The mixture must have the right rheological (flow) properties to prevent rutting which is the permanent deformation of a road caused by repetitive traffic loads. Viscosity is important but elasticity is the most important aspect since the material must be able to recover rather than just resist deformation. This characteristic is most important in warm climates.

(c) The mixture must have good low temperature properties, i.e. resistance to cracking. As a road cools, stresses develop because it cannot shrink uniformly and eventually this will cause cracking. Traffic-caused stresses also contribute. The polymer will lower the temperature at which cracking will occur. This characteristic is more important in cold climates.

(d) Temperature susceptibility of a polymer modified asphalt is a major consideration. Ideally, one would want a binder (asphalt and polymer) which would be "hard" and elastic at elevated temperatures to resist permanent deformation.

To be suitable for synthetic roofing materials, the asphalt polymer mixtures should meet the following requirements:

(a) sufficient resistance to flow at high temperatures, (b) sufficient flexibility at low temperatures, (c) workability according to the conventional methods used in the roofing technique, (d) adequate hot storage stability, (e) adequate hardness to prevent deformation during walking on the roof, and (f) if it is to be used as an adhesive, sufficient adhesion.

British Patent 1,584,504 made bituminous emulsions which were made with an aqueous solution of a polyamine. The emulsion optionally contained a functionalized polymer but the bitumen was modified by functionalizing it with carboxylic acid anhydride groups. The functionalization of asphalt is a difficult and impractical step and is not used commercially.

At the present time, unfunctionalized polymers are being used in paving and roofing applications. Unfunctionalized polymers have certain disadvantages which can cause problems when used in applications such as these. Such disadvantages include undesirably low adhesion to polar materials such as some asphalts, fillers, aggregates, substrates, reinforcing mats, and the like.

SUMMARY OF THE INVENTION

This invention relates to a bituminous composition with improved properties over neat asphalt. The invention is a polymer modified bituminous composition which exhibits better compatibility than previous polymer modified bituminous compositions. The bituminous composition comprises a bituminous component and an epoxidized polymer of a conjugated diolefin. The polymer may be a block polymer containing at least one conjugated diolefin block and, optionally, a vinyl aromatic hydrocarbon block wherein the conjugated diolefin block contains sufficient epoxide groups to improve the compatibility of the block copolymer in the bituminous composition. Specific applications of this composition include roofing materials, coatings, hot melt asphalt concrete and sealant compositions.

DETAILED DESCRIPTION OF THE INVENTION

The bituminous component in the bituminous-polymer compositions according to the present invention may be a naturally occurring bitumen or derived from a mineral oil. Also, petroleum derivatives obtained by a cracking process, pitch and coal tar can be used as the bituminous component as well as blends of various bituminous materials. Any asphalt may be used but the invention is generally more useful for asphalts with high asphaltene contents, i.e. greater than 12%, because such asphalts are generally incompatible with the polymer component. Asphaltenes are known to those skilled in the art. For purposes of this application, asphaltenes make up the n-heptane insoluble fraction of asphalt.

Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils.

Polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like, but it also may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about $-150°$ C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

These polymers are epoxidized, whether they are hydrogenated or not, and it is preferred that the epoxidation take place only to the extent that about 0.1 to about 3 milliequivalents of epoxide per gram of polymer (0.1 to 3 Meq epoxide/g) are generated. Hence, the preferred epoxidized polymer has an epoxide equivalent weight of between about 10,000 and about 333. However, polymers with higher levels of epoxidation may be used to advantage in the present invention, i.e. up to 7 meq or more. For instance, higher levels of epoxidation would lead to a more polar and possibly more reactive polymer which would be more compatible with an asphaltene rich asphalt.

Preferred block copolymers which are useful in the present invention have the formula $$(A-B-A_p)-Y_r-(A_q-B)_m$$

wherein Y is a coupling agent or coupling monomers or initiator, and wherein A and B are polymer blocks which may be homopolymer blocks of conjugated diolefin monomers, copolymer blocks of conjugated diolefin monomers, copolymer blocks of diolefin monomers and monoalkenyl aromatic hydrocarbon monomers or homopolymer blocks of monoalkenyl aromatic hydrocarbon monomers. Polymers of this type are described in more detail in U.S. Pat. No. 5,229,464 which is herein incorporated by reference. Generally, it is preferred that the A blocks should have a greater concentration of more highly substituted aliphatic double bonds than the B blocks have. This produces a polymer wherein most of the epoxy functionality is localized in the exterior blocks the A blocks. Such polymers may be crosslinked more efficiently in asphalt compositions. The A blocks have a molecular weight of from about 100 to about 3,000 and the B blocks have a molecular weight of from about 1000 to about 15,000. n is greater than 0, r is 0 or 1, m is greater than or equal to 0, and n+m ranges from 1 to 100. p and q may be 0 or 1.

Useful randomly epoxidized star polymers are described in U.S. Pat. No. 5,247,026 which is herein incorporated by reference. That patent describes randomly epoxidized star polymers, based on at least one conjugated diolefin monomer, that contained di-, tri- and/or tetrasubstituted olefinic epoxides. The star polymers have greater than four arms or branches. Each arm has a molecular weight from 1500 to 15,000 and the concentration of di-, tri-, or tetrasubstituted olefinic epoxides (1,1-disubstituted, 1,2-disubstituted, 1,1,2-trisubstituted and 1,1,2,2-tetrasubstituted olefinic epoxides) is from 0.05 to 5 milliequivalents of epoxide per gram of polymer.

These polymers should have a vinyl aromatic hydrocarbon content of less than 60% so that they are more compatible with asphalt and greater than 10% so that they will provide flow resistance at reasonable molecular weight. They should have molecular weights greater than 30,000 so that they improve flow resistance at low use levels and less than 1,000,000 so that they are compatible and readily mixable with asphalt. The 1,000,000 molecular weight limit refers to linear structures. Radial or star polymer with from three to fifty arms are also envisioned. Their uncoupled precursor should have a molecular weight below 500,000. After coupling, they could have a molecular weight of up to 50 times 500,000, or 25,000,000.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For polymers of the type described herein, the appropriate standard is a narrow molecular weight polystyrene standard. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pour sized directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

The block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates.

Conjugated dienes which may be utilized to prepare the polymers and copolymers include those having from 4 to 8 carbon atoms and also include 1,3-butadiene, 2-methyl-1,3-butadiene(isoprene), 2,3-dimethyl-1,3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tertbutylstyrene, 2,4-dimethylstyrene, alpha-methylstyrene, vinylnapthalene, vinylanthracene and the like. The preferred vinyl aromatic hydrocarbon is styrene.

Low molecular weight (less than 30,000 molecular weight) epoxidized block polymers are of interest for blending with asphalt when they are active at interfaces or when they are cured or reacted to form higher molecular weight polymers. Low molecular weight epoxidized block polymers are easily mixed into asphalt.

The present invention works with both unhydrogenated and hydrogenated polymers. Hydrogenated ones are useful in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation. Preferred epoxidized polymers for use herein are first partially hydrogenated and then epoxidized as described in the aforementioned U.S. Pat. Nos. 5,229,464 and 5,247,026.

The composition of the present invention generally comprises 80 to 98 parts by weight of a bituminous component and from 2 to 20 parts by weight per 100 parts of the composition of the epoxidized block polymer described above. If less than 2 parts of the polymer of the invention is used, then the composition does not exhibit enhanced properties (increased softening point, decreased penetration and improved fatigue resistance). If more than 20 parts are used, the composition may be too high in viscosity depending upon the specific polymer structure and viscosity.

The compositions of the present invention may optionally include other ingredients like fillers such as ground tires or inorganic fillers like talc, calcium carbonate and carbon black. The composition may also include resins and oils and other components such as stabilizers. It may also include other polymers, for example, other polymers of conjugated diolefins.

Hot melt asphalt concrete compositions according to the present invention are especially advantageous. Hot melt asphalt concrete compositions according to the present invention will normally contain from 80 parts to 99 parts by weight of aggregate and from 1 part to 20 parts of a bituminous composition which is generally comprised of 90 to 98 parts by weight per 100 parts of the bituminous composition of a bituminous component and from 2 parts to 10 parts by weight per 100 parts of the bituminous composition of one of the polymers discussed above. If less than 2 parts of the polymer is used, then improved properties are not obtained and if more than 10 parts of the polymer is used, then the composition is too costly and high in viscosity. Asphalts with good flow resistance prior to polymer addition are preferred at very low polymer concentrations because at very low polymer concentrations the polymer does not contribute strongly to other properties such as deformation resistance, i.e. rutting resistance. In other words, at low polymer concentrations, asphalts with good rutting resistance on their own are preferred.

The bituminous concrete composition may optionally include other ingredients such as fillers, such as ground tires or inorganic fillers. The composition may also include resins and oils and stabilizers. It may also include other polymers, for example, non-functionalized polymers of conjugated diolefins.

Aggregate is basically rocks and sand. It is intended to be mixed with the bituminous composition to form the hot mix asphalt concrete. The bituminous composition is the binder which holds the aggregate together.

In using the bituminous composition of the present invention in hot melt asphalt concrete, it is preferred that these polymers comprise from 2 to 10 parts by weight per hundred parts by weight of the bituminous composition. However, if it is desired to achieve the maximum property improvement in the most cost effective manner, it is most preferred that the polymers comprise from 3 to 6 parts by weight per hundred parts by weight of the bituminous composition.

Roofing compositions according to the present invention are also especially advantageous. In roofing compositions designed for roll roofing membranes a composition of 85 to 92 parts asphalt and 8 to 15 parts polymer is preferred. As with HMAC compositions other additives such as inorganic fillers, resins, oils, and stabilizers may be added.

Similar compositions may be used for laminating adhesives and tab adhesives. For laminating or tab adhesives a composition of 90 to 96 parts asphalt and 4 to 10 parts polymer is preferred.

EXAMPLES

Five different polymers were epoxidized and used in bituminous compositions. The five polymers were a hydrogenated styrene-butadiene-styrene block copolymer (G1652), an unhydrogenated styrene-butadiene-styrene block copolymer (D1102), a styrene-isoprene star polymer coupled with divinyl benzene (D1320X), an isoprene-butadiene star polymer coupled with divinyl benzene (EP112) and an isoprene-styrene/butadiene star polymer coupled with divinyl benzene (F4137BPR).

These polymers were blended at a 12 percent concentration in asphalt WRAC10 and at a 4 percent concentration in asphalt WRAC5. Asphalt WRAC10 is an AC10 asphalt from Shell Oil Company's Woodriver Refinery and WRAC5 is an AC5 asphalt from the same source. The first composition is a typical roofing composition and the second is a typical paving composition. These asphalts can be characterized as moderately incompatible with block copolymers of the type described herein which are not epoxidized. The roofing compositions were tested for compatibility, softening point, penetration, tensile properties, and viscosity. The paving compositions were tested for rheological properties.

Compatibility is measured by heating a sample of the bituminous composition at 160° C. for 5 days and then measuring the amount of asphaltene phase separated from the polymerization phase. The greater the fraction of polymer-rich phase, the greater the compatibility.

The five polymers were epoxidized by reaction with peracetic acid as disclosed in U.S. Pat. No. 5,247,026. Table 1 shows the five polymers and their different levels of epoxide concentration in milliequivalents per gram of polymer.

TABLE 1

| Base Polymer | Epoxidized Polymer | meq/g Epoxide |
| --- | --- | --- |
| G1652 | EP122 | 0.9 |
| D1320X | 20023-25 | 1.5 |
| D1102 | 20808-23B | 0.9 |
| I-B-DVB | EP112 | 0.6 |
| I-SB-DVB | F4137BPR | 0.6 |

The results of the comparisons of the different roofing composition blends are shown in Table 2. In each case, the base polymer is compared with the epoxidized version thereof. It can clearly be seen that the compatibility of each of the polymers as measured by FPR (fraction polymer rich) is dramatically increased while the other properties are not dramatically reduced.

TABLE 2

| | | Properties of Blends | | | | | |
| --- | --- | --- | --- | --- | --- | --- | --- |
| Polymer Asphalt | Conc. | Soft Pt. °F. | pen dmm | FPR % | TenStr psi | Elong % | Brk En. lb-in |
| G1652 WRAC10 | 12% | 194 | 28 | 60 | 99 | 754 | 8.6 |
| EP122 WRAC10 | 12% | 179 | 29 | 68 | 82 | 981 | 8.5 |
| D1320X WRAC10 | 12% | 180 | 58 | 56 | 46 | 1093 | 5.4 |
| 20023-25 WRAC10 | 12% | 177 | 60 | 80 | 40 | 1696 | 7.0 |
| D1102 WRAC10 | 12% | 181 | 37 | 59 | 32 | 1246 | 3.7 |
| 20808-23B WRAC10 | 12% | 175 | 43 | 64 | 19 | 1007 | 2.0 |
| EP112 WRAC10 | 12% | 129 | — | 55 | — | — | — |
| F4137BPR WRAC10 | 12% | 124 | 174 | 77 | — | — | — |

Similarly, Table 3 shows the rheological results of the comparisons of the paving compositions. It can be seen that all of the polymers give an improvement in modulus. In the case of G1652, the epoxidized polymer EP 122 gives more improvement than the unepoxidized polymer. This is probably a result of the improved compatibility.

TABLE 3

| Properties of Blends | | |
| --- | --- | --- |
| Polymer Asphalt | Conc. | Complex modulus G* at 60° C. + 1 rad/sec |
| G1652 WRAC5 | 4% | 600 Pa |
| EP122 WRAC5 | 4% | 1000 Pa |
| D1320X WRAC5 | 4% | 700 Pa |
| 20023-25 WRAC5 | 4% | 650 Pa |
| D1102 WRAC5 | 4% | 600 Pa |
| 20808-23B WRAC5 | 4% | 400 Pa |
| EP112 WRAC5 | 4% | 200 Pa |
| F4137BPR WRAC5 | 4% | 100 Pa |
| Neat WRAC5 | — | 50 Pa |

We claim:

1. A bituminous composition comprising a bituminous component and an epoxidized polymer of a conjugated diolefin and, optionally, a vinyl aromatic hydrocarbon.

2. The composition of claim 1 wherein the polymer also comprises at least one vinyl aromatic hydrocarbon.

3. The composition of claim 1 wherein the polymer comprises from 2 parts to 20 parts by weight of the bituminous composition.

4. The composition of claim 1 wherein the polymer is selectively hydrogenated.

5. A hot melt asphalt concrete composition comprising:
(a) from 80 parts to 98 parts by weight of aggregate, and
(b) from 2 parts to 20 parts by weight of the bituminous composition of claim 1.

6. The hot melt asphalt concrete composition of claim 5 wherein the bituminous composition is comprised of:
   (a) from 90 parts to 98 parts by weight per 100 parts of the bituminous composition of the bituminous component, and
   (b) from 2 parts to 10 parts by weight per 100 parts of the bituminous composition of the polymer.

7. The hot melt asphalt concrete composition of claim 6 wherein the polymer comprises from 3 parts to 6 parts by weight per hundred parts by weight of the bituminous composition.

8. A roll roofing membrane comprising a membrane and the bituminous composition of claim 1.

9. The roll roofing membrane of claim 8 wherein the polymer comprises from 8 to 15 parts per 100 parts by weight of the bituminous composition.

10. A bituminous adhesive composition comprising the bituminous composition of claim 1.

11. The bituminous composition of claim 10 wherein the polymer comprises from 4 to 10 parts per 100 parts of the bituminous composition.

12. The composition of claim 2 wherein the polymer is a vinyl aromatic hydrocarbon/diene/vinyl aromatic hydrocarbon triblock polymer.

* * * * *